United States Patent [19]

Fujimori

[11] 4,046,846

[45] Sept. 6, 1977

[54] METHOD OF PRODUCING HARD FOAMED MATERIALS

[76] Inventor: Tokuzo Fujimori, No. 167, Fukuichi, Yonago, Totori, Japan

[21] Appl. No.: 497,297

[22] Filed: Aug. 14, 1974

[30] Foreign Application Priority Data

Sept. 1, 1973   Japan .............................. 48-98370

[51] Int. Cl.$^2$ ............................................. B29D 27/00
[52] U.S. Cl. .............................. 264/45.3; 260/2.5 P; 264/53; 264/55; 264/211; 264/DIG. 5; 264/DIG. 13; 264/DIG. 17
[58] Field of Search ........ 264/DIG. 17, 54, DIG. 60, 264/55, 45.3, 53; 260/2.5 P

[56] References Cited

U.S. PATENT DOCUMENTS

| 2,498,074 | 2/1950 | Feldman | 264/55 |
|---|---|---|---|
| 2,525,880 | 10/1950 | Feldman | 264/55 |
| 2,525,965 | 10/1950 | Smith | 264/55 |
| 2,692,863 | 10/1954 | Iler | 264/DIG. 60 |
| 3,306,960 | 2/1967 | Weissman et al. | 264/DIG. 17 |
| 3,773,873 | 11/1973 | Spaak et al. | 264/DIG. 17 |
| 3,812,224 | 5/1974 | Smith et al. | 264/DIG. 17 |
| 3,812,225 | 5/1974 | Hosoda et al. | 264/DIG. 17 |
| 3,846,523 | 11/1974 | Geerdes | 264/DIG. 17 |
| 3,911,070 | 10/1975 | Lundsager | 264/DIG. 17 |
| 3,912,667 | 10/1975 | Spitzer et al. | 264/DIG. 17 |

FOREIGN PATENT DOCUMENTS

| 1,321,630 | 2/1962 | France | 264/DIG. 60 |
|---|---|---|---|
| 47-48272 | 12/1972 | Japan | 264/DIG. 17 |

OTHER PUBLICATIONS

"SPI-Plastics Engineering Handbook" Third edition, New York, Reinhold, c 1960, pp. 226, 227, 239–250.
Penn, W. S. "PVC Technology," Third edition revised and edited by W. V. Titow and B. J. Lanham, New York, Wiley-Interscience, [1971] pp. 393, 411–416, 486–491, 497.

*Primary Examiner*—Philip Anderson
*Attorney, Agent, or Firm*—James E. Nilles

[57] ABSTRACT

A hard foamed material having a small specific gravity and a high mechanical strength is produced by mixing vinyl chloride resin with a large amount of inorganic powdery substances and a solvent, heating and kneading the resulting mixture in a closed kneader at a given temperature, adding a liquefied butane with a solvent thereto, and heating and foaming the resulting mixture in a mold.

5 Claims, No Drawings

METHOD OF PRODUCING HARD FOAMED MATERIALS

BACKGROUND OF THE INVENTION

The present invention relates to a method of producing hard foamed materials having a small specific gravity and an increased mechanical strength by the addition of a large amount of inorganic powdery substances.

Hitherto, vinyl chloride resin foamed bodies have been widely used as a heat insulating material because of their excellent flame retarding property, chemical resistance and mechanical strength. However, there is a drawback that the foamed bodies are relatively weak to heat so that volume contraction is caused when they are exposed to a higher temperature or hydrogen chloride gas is produced when they are subjected to flame. Furthermore, they are expensive in the production cost as compared with other foamed plastics such as polyurethane and the like, so that they have been used in a relatively specific field irrespective of their excellent properties. Therefore, a method has been studied wherein polyvinyl chloride resin is mixed with a large amount of inorganic powdery substances such as calcium carbonate, calcium sulfate and the like in order to decrease the production cost and the volume contraction when they are heated, wherein the mechanical strength is further improved, and wherein the generation of hydrogen chloride gas is lowered even if the foamed body is heated or subjected to flame, and the like. For instance, a method has been developed wherein the vinyl chloride resin is mixed with an inorganic powdery substance having therein molecule bonding water and the resulting mixture is heated to generate steam and to form a foamed body.

However, the vinyl chloride resin does not show a clear melting point different from, for example, polyolefin and is liable to decompose by the heating. Further, when the vinyl chloride resin is mixed with a large amount of inorganic powdery substances, these powders can not sufficiently and uniformly be dispersed in the resulting mixture, so that it is difficult to thoroughly effect gelation for producing a foamed body. For example, when the inorganic powdery substances are used in an amount of not less than 25%, vinyl chloride resin foamed body having a specific gravity of not more than 0.3 can not be obtained.

SUMMARY OF THE INVENTION

An object of the present invention is to solve the above described drawbacks and to provide hard vinyl chloride resin foamed materials containing not less than 40% of inorganic powdery substances.

That is, the present invention consists of a method of producing hard foamed materials, which comprises the steps of mixing vinyl chloride resin with a large amount of inorganic powdery substances and a solvent, heating and kneading the resulting mixture in a closed kneader at a temperature of 40° C to 100° C, adding a liquefied butane with a solvent thereto, and then heating and foaming the resulting mixture in a closed mold under pressure.

DESCRIPTION OF A PREFERRED EMBODIMENT

According to the present invention, it is preferable to use vinyl chloride resin having a fine particle size in order to satisfactorily provide for the mixing of the vinyl chloride resin with the inorganic powdery substances, uniformity of gelation (by heating) and foaming uniformity, because the gelation is not carried out by violent shearing, for example, by kneading with hot rollers (in case of using plastisol). Particularly, a best result may be obtained by using vinyl chloride resin having mainly a particle size of not more than a few microns, that is, a so-called paste resin.

As to the inorganic powdery substance, use may be made of pastes or powders of carbonates, sulfates, silicates, oxides and hydroxides of calcium, magnesium and aluminium; talc, bentonite, clay and the like. In order to improve the properties of the resulting foamed product, e.g. foaming uniformity, mechanical strength and the like, it is necessary to use the inorganic powdery substance having a fine particle size, preferably a particle size passing through 200 mesh sieve to not less than 90%. Especially, in case of talc or calcium hydroxide, powders having an appropriate particle size can be easily obtained, so that the best result may be achieved by using such powders alone or in admixture.

The amount of the inorganic powdery substance to be used is 0.4 to 40 times that of the vinyl chloride resin on a weight ratio. When the amount is less than the lower limit, it is difficult to obtain desirable mechanical strength and heat resistance, while when the amount exceeds the upper limit, it is difficult to sufficiently effect the foaming and the resulting foamed product is brittle, if produced.

Use may be made of xylene and toluene alone or in admixture as the solvent. The amount of the solvent is 30 to 40 parts by weight in case of mixing with the inorganic powdery substance, and 30 to 40 parts by weight in case of mixing with liquefied butane as a foaming agent based on 100 parts of main ingredients consisting of the mixture of vinyl chloride resin and inorganic powdery substance, respectively.

The liquefied butane as the foaming agent is added in an amount of 10 to 20 parts by weight based on 100 parts by weight of main ingredients. In this case, the liquefied butane is added in the amount slightly larger than that required for foaming because it evaporates.

Furthermore, a foaming assistant may be added in a small amount. As the foaming assistant, use may be made of azobisisobutyronitrile, azodicarbonamide, ammonium carbonate and ammonium chloride. Thus, after the primary foaming is caused by the liquefied butane, the foaming assistant causes secondary foaming by heating to uniformly disperse butane gas, whereby foams are stabilized.

In order to increase the fire-proof property and shock resistance of the goods, inorganic fiber materials such as asbestos, rock-wool and glass fiber etc. may be added. The quantity of said ingredients is 2% to 15% by weight in consideration of the foamability.

The following examples are given in illustration of this invention and are not intended as limitations thereof.

Example 1

| Main ingredients: | | |
|---|---|---|
| Vinyl chloride resin (paste) | 30 | parts by weight |
| Calcium carbonate ($CaCO_3$) | 35 | " |
| Magnesium silicate ($3MgSiO_2 . H_2O$) | 35 | " |
| Additives: | | |
| Asbestos | 7 | " |
| Lead stearate | 3 | " |
| Chlorinated paraffin | 5 | " |
| Azodicarbonamide | 2 | " |

The above described ingredients were charged into a closed kneader heated at 60° C to 80° C, and toluene or xylene or a mixture thereof was added as a solvent in an amount of 30 to 40 parts based on 100 parts of the main ingredients, and then the resulting mixture was kneaded with biaxial rollers for 10 minutes to effect gelation. During this gelation, the vinyl chloride resin was dissolved in the solvent by the heating, whereby the fine particles of the inorganic substances were thinly covered over the surface thereof with the dissolved resin and adhered to each other by the resin. As a result, there was obtained a gelated material in which a large amount of the inorganic powdery substances were covered with a small amount of the vinyl chloride resin.

Then, the resulting gelated material was added and mixed with 10 to 15 parts of liquefied butane adn 30 to 40 parts of the above described solvent based on 100 parts of the main ingredients for 15 minutes using the above described kneader in which cool water passed through a jacket thereof or another closed kneader cooled below 25° C. The pressure in the closed kneader rose to a certain extent (5 – 10 Kg/cm$^2$) due to evaporation of the solvent and liquefied butane. During this procedure, however, the evaporation of the solvent and liquefied butane was prevented, while the liquefied butane was uniformly dispersed and dissolved in the solvent, whereby the gelated material consisting of polyvinyl chloride and inorganic powdery substances was softened without the separation of the material to form a sol, in which the liquefied butane was dispersed uniformly.

Then, the thus obtained sol was charged through an extruder into a metal mold pressurized at 200 Kg/cm$^2$ and heated with steam at 150° C to 190° C for 60 minutes to effect gelation. Thereafter, the mass was cooled to about room temperature in the mold under pressure and removed therefrom, during which a primary foaming was completed.

Next, the primary foamed material thus obtained was heated in a hot-air circulating device at 90° C to 110° C for 60 minutes to effect a secondary foaming, whereby a foamed product was obtained. In this case, butane gas dispersed in the material by the primary foaming was further uniformly dispersed and stabilized by the foaming of azodicarbonamide as the foaming assistant when the material is subjected to the secondary foaming.

The thus obtained foamed product had a specific gravity of 0.15.

Example 2

| Main ingredients: | | |
|---|---|---|
| Vinyl chloride resin | 50 | parts by weight |
| Calcium carbonate (CaCO$_3$) | 25 | " |
| Calcium hydroxide (Ca(OH)$_2$) | 25 | " |
| Additives: | | |
| Azodicarbonamide | 2 | " |
| Chlorinated paraffin | 10 | " |

A mixture of the above described ingredients was foamed in the same manner as described in Example 1 to obtain a foamed product having a specific gravity of 0.08.

According to the present invention, the vinyl chloride resin is mixed with the inorganic powdery substances in an amount 1 to 40 times that of said vinyl chloride resin on a weight ratio and the solvent and the resulting mixture is heated and kneaded in the closed kneader at a temperature of 40° C to 100° C as described above, so that the vinyl chloride resin is throughly dissolved in the solvent by the heating and increased its fluidity and tackiness, whereby each surface of fine particles of inorganic powdery substances is covered with the dissolved resin in the form of thin film and at the same time the resulting film acts as an adhesive for adhering fine particles to each other to bond the resin to the inorganic powdery substances in the gelated state. Furthermore, the resulting gelated material is added and mixed with the liquefied butane and the solvent in the closed kneader, so that the liquefied butane as the foaming agent together with the solvent penetrates into the gelated material consisting of the resin, the inorganic powdery substances and the solvent and is uniformly dispersed therein without separating the inorganic powdery substances. Thus, a sol in which the inorganic powdery substances are dispersed uniformly without separating from the resin can be obtained. The sol is heated in the closed metal mold, so that the liquefied butane is foamed while being suppressed. As a result, a homogeneous foamed material can be obtained in spite of the presence of the large amount of inorganic powdery substances.

Moreover, the foamed material obtained by the primary foaming and cooled in the metal mold is taken out of the metal mold and heated so that the foaming agent dispersed uniformly in the foamed material by the primary foaming is foamed secondary, thereby obtaining a homogeneous light foamed material without reducing the mechanical strength thereof.

What is claimed is:

1. In the method of producing hard foamed objects of expanded vinyl chloride resin which comprises forming a mixture comprised of said vinyl chloride resin and a blowing agent; introducing the mixture into a mold; pressurizing the mold while heating the mold to cause the blowing agent to partially expand the resulting resin mixture to fill said mold; cooling said mold; removing the resulting object from said mold and then heating the object to further expand its size without changing its shape, the improvement which comprises: forming a dry mixture of said resin with about 0.4 to about 40 times by weight of the resin of a powdery inorganic filler, adding to the dry mixture at least about 30 parts by weight of said mixture of a solvent selected from toluene and xylene, kneading the solvent, resin and inorganic filler containing mixture in a closed kneader at about 40° to about 100° C until the outer surfaces of the particles of said inorganic filler are covered with said resin and are adhered to each other by said resin, adding a blowing agent comprised of liquid butane, and an additional amount of about 30 to about 40 parts by weight of said solvent, thoroughly mixing the resulting mixture so that all the ingredients including the liquid butane are thoroughly dispersed and then introducing said mixture into said mold.

2. The method of claim 1 wherein the inorganic filler is selected from carbonates, sulfates, silicates, oxides and hydroxides of calcium, magnesium and aluminum; talc, bentonite, clay and mixtures thereof.

3. The method of claim 1 wherein not less than 90% of the inorganic filler has a particle size which passes through a 200 mesh sieve.

4. The method of claim 1 in which about 2% to about 15% by weight of the total mixture of a fireproofing agent is added to the dry mixture.

5. The method of claim 1 wherein the liquid butane is added in an amount of about 10 to about 20 parts by weight of the mixture of vinyl chloride resin and inorganic filler.

* * * * *